United States Patent

[11] 3,545,505

| [72] | Inventors | William R. DeWesse<br>Park Forest;<br>Louis J. Bucha, Lansing, Illinois |
|---|---|---|
| [21] | Appl. No. | 721,957 |
| [22] | Filed | April 17, 1968 |
| [45] | Patented | Dec. 8, 1970 |
| [73] | Assignee | Remington Arms Company, Inc.<br>Bridgeport, Connecticut<br>a corporation of Delaware |

[54] LAMINATED GUIDE BAR FOR CHAIN SAW
8 Claims, 8 Drawing Figs.

[52] U.S. Cl. .................................................... 143/32
[51] Int. Cl. ...................................................... B27b 27/02
[50] Field of Search .......................................... 143/32;
308/(Digest)

[56] References Cited
UNITED STATES PATENTS
3,191,646  6/1965  Merz ............................. 143/32
FOREIGN PATENTS
649,018  9/1962  Canada ......................... 143/32(10)

Primary Examiner—Donald R. Schran
Attorneys—John H. Lewis, Jr., John W. Phipps and Nicholas Skovran ABSTRACT: A composite plastic-metal laminated guide bar for a chain saw made by placing two hardened metal inserts in a mold and injecting plastic into the mold cavity. The metal inserts have a substantial network of openings therein, all of which are filled with plastic during molding, thus reducing the weight of the unit. At least some of the openings are chamfered or recessed on the outer face of the metal inserts so that upon cooling of the plastic, the enlarged plastic heads formed in the chamfered or recessed space will shrink to act in tension against the metal inserts, thus forming a rigid laminated unit.

PATENTED DEC 8 1970  3,545,505
Fig. 1.
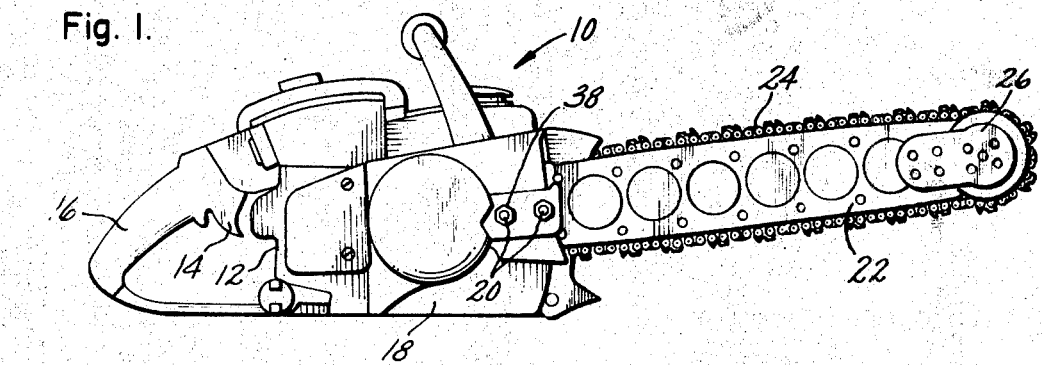
Fig. 2.
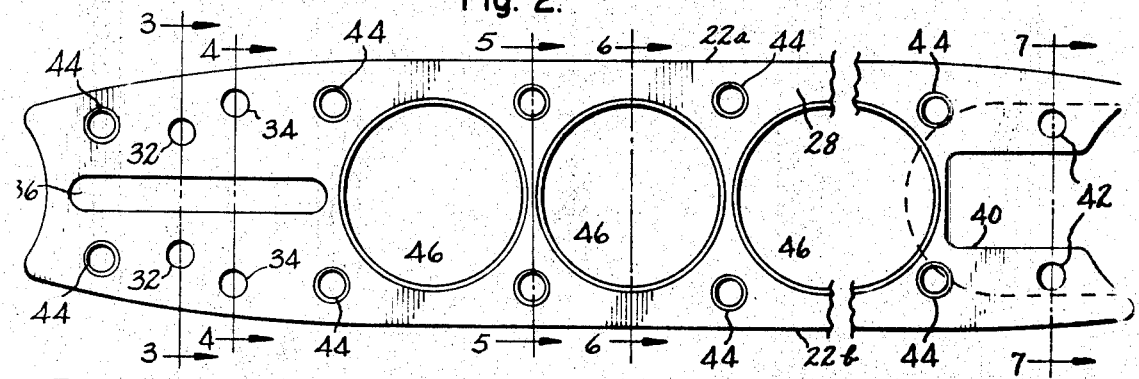
Fig. 3.  Fig. 4.  Fig. 5.  Fig. 6.  Fig. 7.
    
Fig. 8.
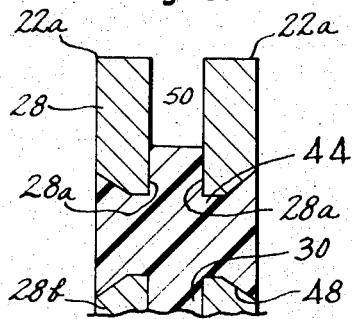
Inventors:
William R. DeWeese,
Louis J. Bucha,
John H. P......, Jr.
John W. Phipps
by Nicholas Skovran
Attorneys

LAMINATED GUIDE BAR FOR CHAIN SAW

This invention relates to a laminated guide bar for a chain saw wherein plastic is used with metallic inserts to provide a lightweight, rigid, guide bar unit.

It is an object of this invention to provide an improved guide bar for a chain saw which is light in weight, strong in use, and economical to manufacture.

It is another object of this invention to provide a novel method of making an improved laminated guide bar.

In the past, chain saw manufacturers have made guide bars from solid steel blanks and more recently, efforts have been directed to making laminated metallic guide bars in order to reduce the cost of producing a suitable product. The trend in the chain saw industry clearly is towards smaller and lighter units. Not only has the size of the gasoline engine been reduced in the past few years but the saw chain and guide bar also have been reduced proportionately.

This invention relates to an improved guide bar where weight reduction is of primary importance. Guide bars have been made in the past with large holes in the material to reduce weight, the use of holes or voids in solid material being an obvious way of reducing weight. In practice, however, it has been found that the holes fill up with sawdust and contribute to binding of the saw in the cut. Guide bars have also been made with the rails and the mounting portions made of steel and the center section made of a lighter metal, e.g., aluminum.

In addition to reducing the weight of the guide bar substantially, a composite plastic-metal laminated guide bar has other important advantages. For example, the plastic is self-lubricating and reduces friction between rubbing or wearing parts. The laminated guide bar eliminates grinding or milling of the chain groove in the bar. The chain groove will be in the center of the guide bar. The rails of the guide bar will have an equal width or thickness for equal and longer chain wear. The hardness of the metal inserts or the rails can be made as hard as is desired for longer wear life. The rails of the guide bar may be worn lower because there is no metal bottom in the chain groove. The plastic bottom in the chain groove may be regrooved (made deeper) by the saw chain as it is used, rather than having the groove ground deeper. Also, the plastic will be more ductile than the metal so the laminated bar will have more flexibility than the solid metal bar.

Another advantage of the present laminated guide bar is that a fracture point (notch effect) in the bottom of the chain groove is eliminated. This fracture point is present in conventional steel guide bars when the chain groove is ground or milled into the bar.

Another advantage which is not related to weight, cost, or performance is that the plastic can be made in any color so that the plastic portion can be made to match or accentuate the chain saw for increased saleability, marketing and customer acceptance.

Other objects and advantages will be apparent from the following description and accompanying drawings in which:

FIG. 1 is a side view of a conventional chain saw showing an improved laminated guide bar;

FIG. 2 is a side view of a laminated guide bar made according to the present invention;

FIG. 3 is a transverse cross-sectional view taken on line 3-3 of FIG. 2;

FIG. 4 is a transverse cross-sectional view taken on line 4-4 of FIG. 2;

FIG. 5 is a transverse cross-sectional view taken on line 5-5 of FIG. 2;

FIG. 6 is a transverse cross-sectional view taken on line 6-6 of FIG. 2; and

FIG. 7 is a transverse cross-sectional view taken on line 7-7 of FIG. 2.

A conventional gasoline driven chain saw 10 is shown in FIG. 1. Operation of the gasoline engine 12 is controlled by trigger 14, which is positioned on handle 16. Detachably connected to the forward portion of the chain saw frame 18 by means of guide bar nuts 20 is a guide bar 22. Saw chain 24 rides on peripheral portions 22a and 22b of guide bar 22, over a roller nose 26 mounted at the front end of the bar and over a sprocket (not shown) mounted on the frame and operatively connected to be driven to the engine in a conventional manner.

The above description applies to conventional saws presently on the market.

The present invention refers to an improved guide bar normally found in the environment mentioned above. However, it should be appreciated that the invention also has utility in other types of situations, for example, in an electric chain saw, etc.

FIG. 2 is a sectional view which illustrates the laminated plastic-metal guide bar 22. Although from this point on, the metal portion of the guide bar will be referred to as steel, it is not intended that this application is to be so limited.

Laminated guide bar 22 comprises a pair of perforated steel side plates 28 which are spaced apart parallel to one another and a plastic member 30 sandwiched between the steel side plates 28. For the purpose of simplicity in explanation, it will be assumed that both steel plates 28 are identical in outside peripheral configuration as well as the number, size, position, and configuration of all of the perforations therein. However, as will be explained later, it is not necessary for the side plates to be identical.

Each of the steel side plates 28 has an upper peripheral surface 22a and a lower peripheral surface 22b which acts as rail means for the saw chain. Each side plate also has a plurality of openings or perforations therethrough for reasons to be explained later. Thus, at the rear of the side plate are adjustment openings 32 through which a portion of an adjusting block (not shown) protrudes. The adjusting block is conventional and functions to adjust the tension on the saw chain. Also located at the rear of the side plate are oil passageways 34, one of which is in communication with a source of oil. Since the guide otherwise is symmetrical, only one of the two oil openings 34 generally is in use at one time, although of course there is no reason why the two openings could not be connected to the oil source at the same time. Also at the rear of the guide bar is an elongated slot 36 in which frame-mounted pins 38 are positioned. The pins 38 can move in a longitudinal direction relative to said slot 36 to permit taking up the saw chain slack. Pins 38, slot 36, and guide bar nuts 20 constitute the mounting means by which the guide bar is mounted to the chain saw frame.

At the front of the steel side plates 28 is located a guide slot 40 and openings 42 by which roller nose 26 is mounted on the guide bar.

In addition to adjustment openings 32, oil openings 34, slot 36 and roller nose mounting openings 42, each side plate has a plurality of small attaching openings 44 and larger weight reducing openings 46.

Attaching openings 44 and weight reducing openings 46 are filled with plastic in the finished guide bar unit while openings 32, 34, 36, and 42 remain as apertures in the laminated guide bar for the purposes set forth above. The number, size, configuration and positioning of attaching openings 44 and weight reducing openings 46 can be varied without interfering with the purposes of this inventions. However, the size, positioning, configuration, etc., of the openings 32, 34, 36, and 42 should be identical in the two side plates for best performance, that is, to retain the feature of a symmetrical guide bar which could be used in either a first position or a reversed position.

Attaching openings 44 and weight reducing openings 46 have two important functions: (1) to reduce the weight of the guide bar, and (2) to permit plastic to be injection molded therein which acts as locking means to hold the laminated unit together.

FIG. 8 shows a blown-up view of how the two steel side plates 28 are held together by the intermediate plastic member 30. Each steel side plate 28 has an inner face 28a and an outer face 28b. Openings 44 have chamfered or otherwise recessed faces 48 opening up to the outer face 28b.

Intermediate plastic member 30 is positioned between the two parallel side plates and extends outwardly toward the upper and lower peripheral surfaces 22a and 22b of the side plates to form a groove or channel 50 in which the saw chain rides. Also, integrally formed with the plastic member 30 are a plurality of plastic bosses 52 which fill the openings 44. Bosses 52 have enlarged heads 54 which under operating conditions act in tension against the chamfered faces 48 to pull the side plates in against the plastic member 30. Although the enlarged heads 54 of the bosses 52 are shown as chamfered portions, it is obvious that any configuration wherein the outer face of the enlarged head is contiguous with the outer face 28b of the side plates will be suitable.

In addition to the bosses 52 in the smaller attaching openings 44, other bosses 56 with enlarged heads 58 are integrally formed with the plastic member 30 and are located in the weight-reducing openings 46. Thus, the laminated guide bar can be held together by the enlarged heads 54 and 58 which extend through the smaller attaching openings as well as the larger weight-reducing openings—or any combination thereof.

In the molding process, the two metal side plates are placed into the die on location pins. Two spacers are placed between these side plates to hold them apart and also maintain the groove dimension. The plastic is then forced into the center of the die under high pressure. This provides a uniform product with the rails for the chain to run on being parallel, and the same thickness throughout both sides of the guide bar.

Inasmuch as the present invention does not depend on a chemical bond to hold the two outside plates of the laminated guide bar together, almost any type of plastic can be used which has a reasonable tensile strength, high heat resistance, and flexural rigidity. The tensile requirement is needed to fix the position of the steel members and prevent their separation under load. Heat resistance is needed to maintain the integrity of the assembly under the influence of frictional heat developed during sawing. Structural rigidity (modulus of elasticity) is required in order to maintain cutting characteristics of the guide bar.

A number of plastics have been used successfully in conjunction with the laminated structure of the present invention. These have ranged from the unfilled "ZYTEL" 101 nylon resin to filled or reinforced plastics of the "NYLAFIL" (fiberglas reinforced nylon) type. "TEFLON" fluorocarbon resin has been used successfully when combined with nylon and fiberglass.

Investigation has shown that requirements for those properties cited above are met by resins similar to the "ZYTEL" 101 resin. Quantitatively, these minimum requirements are:

Tensile strength—About 8,000 p.s.i.
Heat deformation temp. (ASTM D648)—About 220° F.
Modulus of elasticity—About $3.5 \times 10^5$ p.s.i.

The stronger reinforced thermoplastics have improved properties, as follows:

Tensile strength—About 20,000 p.s.i.
Heat deformation temp.—About 495° F.
Modulus of elasticity—About $18 \times 10^5$ p.s.i.

Obviously, other plastics or combinations can be used if they have superior properties to the minimum requirements mentioned above.

We claim:

1. A guide bar unit for a chain saw comprising a pair of outer side plates made of metal which are spaced apart and positioned parallel to one another, rail means on upper and lower portions of said side plates, an intermediate member made of plastic interposed between said side plates, said plastic member having upper and lower edges which are substantially parallel to but spaced from said rail means to form chain groove means therewith, and means attaching said intermediate plastic member to each of said metallic side plates thus forming a rigid, laminated, guide bar unit each of said metallic side plates has a plurality of openings therein, said plastic member having a plurality of outwardly extending bosses integrally formed therewith, said bosses nonmovably positioned in said openings to constitute said means which attach the plastic member to each of said metallic side plates.

2. A guide bar unit for a chain saw comprising a pair of outer side plates of metal which are spaced apart and positioned parallel to one another, rail means on upper and lower portions of said side plates, an intermediate member made of plastic interposed between said side plates, said plastic member having upper and lower edges which are substantially parallel to but spaced from said rail means to form chain groove means therewith, and means attaching said intermediate plastic member to each of said metallic side plates thus forming a rigid, laminated, guide bar unit, each of said side plates has a plurality of holes therein which reduce the weight of the guide bar, at least some of said holes being chamfered outwardly towards the outer faces of said side plates, said plastic member having a plurality of integrally formed and outwardly projecting sections positioned within said chamfered holes, and having outer, tapered, thickened portions which fit said chamfered holes to act as plastic rivet heads thus constituting said means which attach said side plates and said intermediate plastic member together.

3. A guide bar unit for a chain saw as recited in claim 1 wherein said plastic has a tensile strength of at least 8,000 p.s.i., a heat deformation temperature (ASTM D648) of at least 220°F., and a modulus of elasticity of at least $3.5 \times 10^5$ p.s.i.

4. A guide bar unit for a chain saw as recited in claim 1 wherein said plastic is of nylon reinforced with at least fiberglass.

5. A laminated guide bar comprising two spaced-apart and parallel metal plates, each of said plates having: (a) an inner and outer side face; (b) upper and lower rail means; and (c) a plurality of openings extending through said metal plates; said outer side faces being chamfered at said openings, a unitary plastic member molded in place between said metal plates, and means integrally formed with said plastic member to clamp said metal plates tightly against said unitary plastic member to form a rigid, laminated, guide bar unit.

6. A laminated guide bar as recited in claim 5 wherein said clamping means comprises outwardly projecting lugs which fill up and extend through said openings, enlarged heads on the outer ends of said lugs, each of said enlarged heads having an outwardly inclined continuous face in clamping abutment with a corresponding one of said chamfered faces of said metal plates and an exterior face flush with and contiguous with the adjacent metal plate outer side face.

7. A laminated guide bar as recited in claim 5 wherein said plastic has a tensile strength of at least 8,000 p.s.i., a heat deformation temperature of at least 220° F., and a modulus of elasticity of at least $3.5 \times 10^5$ p.s.i.

8. A laminated guide bar for a chain saw comprising a pair of rigid, metallic side plates positioned on opposite sides of an intermediate plastic member, means integrally formed with said plastic member clamping the two metallic side plates against the plastic member to form a rigid, laminated, guide bar structure, each of said metallic side plates has a plurality of transverse openings therein, at least some of which have recess means at the outside ends thereof, said means clamping the metallic side plates against the plastic member comprising outwardly extending portions integrally formed with said plastic member which fill up said openings, the outwardly extending portions which correspond to the openings having recess means therein having enlarged head portions which fill up said recess means and are biased thereagainst to pull the metallic side plates tightly against the plastic member.